United States Patent [19]

Daley et al.

[11] Patent Number: 5,178,772
[45] Date of Patent: Jan. 12, 1993

[54] PROCESS FOR DESTRUCTION OF METAL COMPLEXES BY ULTRAVIOLET IRRADIATION

[75] Inventors: Peter S. Daley, Glen Ellyn; Yuval Halpern, Skokie, both of Ill.

[73] Assignee: Chemical Waste Management, Inc., Oak Brook, Ill.

[21] Appl. No.: 794,720

[22] Filed: Nov. 15, 1991

[51] Int. Cl.$^5$ ............ C02F 1/32; C02F 1/62; C02F 1/72
[52] U.S. Cl. ............... 210/721; 210/748; 210/759; 210/912
[58] Field of Search ........ 210/748, 759, 760, 912, 210/721, 754, 756

[56] References Cited

U.S. PATENT DOCUMENTS

| | | | |
|---|---|---|---|
| 3,767,572 | 10/1973 | Bober et al. | 210/721 |
| 3,920,547 | 11/1975 | Garrison et al. | 204/176 |
| 4,012,321 | 3/1977 | Koubek | 210/748 |
| 4,289,594 | 9/1981 | Alpaugh et al. | 204/158 R |
| 4,332,687 | 6/1982 | Daignault et al. | 210/721 |
| 4,419,246 | 12/1983 | Jayawant | 210/721 |
| 4,446,029 | 5/1983 | Betermier et al. | 210/748 |
| 4,512,900 | 4/1985 | Macur et al. | 210/748 |
| 4,792,467 | 12/1988 | Zeff et al. | 210/748 |
| 4,846,978 | 7/1989 | Leggett et al. | 210/748 |
| 4,849,114 | 7/1989 | Zeff et al. | 210/747 |

FOREIGN PATENT DOCUMENTS

| | | | |
|---|---|---|---|
| 9794 | 3/1972 | Japan | 210/748 |
| 49857 | 5/1978 | Japan | 210/904 |
| 8902466 | 5/1991 | Netherlands | 210/748 |

OTHER PUBLICATIONS

EPRI Report No. NP-4954 pp. 3-41 to 3-49 (Nov. 1986).

*Primary Examiner*—Stanley S. Silverman
*Assistant Examiner*—Neil M. McCarthy
*Attorney, Agent, or Firm*—Allegretti & Witcoff, Ltd.

[57] ABSTRACT

Metal complexes and especially nickel EDTA is decomposed by adding an oxidizing agent to an aqueous solution containing metal complexes to define an oxidizable aqueous solution. The oxidizable aqueous solution is then exposed to a source of ultraviolet radiation in the range of from 185-300 nanometers for a period of time sufficient to destroy the complex portion of the metal complex. The remaining metal is recovered.

7 Claims, No Drawings

PROCESS FOR DESTRUCTION OF METAL COMPLEXES BY ULTRAVIOLET IRRADIATION

BACKGROUND OF THE INVENTION

1. Field of the Invention

Stabilization of metals in aqueous hazardous waste usually is accomplished by converting the metal ions into insoluble solid precipitate (i.e., hydroxide, carbonate, sulfate, etc.). When this type of precipitate is mixed in cement and the final product passes the leaching test, the stabilized waste can be placed in the appropriate landfill. In most cases, mixing the aqueous metal solution with a base (i.e., lime) and cement will suffice to stabilize the metals in the waste.

However, there are cases in which metals cannot be converted into the insoluble hydroxide, carbonate or sulfate because the metal is in an improper oxidation state. This causes the metal to leach from the "stabilized" waste during the leaching test. In some cases, this situation is corrected by changing the oxidation state of the metal prior to stabilization.

Metals held very strongly in a form of a chelate (i.e., EDTA) or a complex (i.e., cyanide) also fail the leaching test after "stabilization." Metals such as nickel, cadmium and cobalt for example cannot be converted into the insoluble form by a simple adjustment of pH or the action of anions such as sulfate or carbonate in such an environment. They are held too tightly by the complexing or chelating agent and cannot be precipitated. The best way to free the metal is to destroy the complexing power of the complexing or chelating agent. Since the complexing or chelating agent is an organic moiety, its destruction is usually achieved by oxidation of this organic material by incineration or hypochlorite oxidation. There are cases, expecially if the complexes are very resistant to chemical oxidation and/or are present in a dilute water solution, where the above mentioned treatment will not be able to convert the metals to a form that will be amenable for efficient stabilization. Therefore, a method to efficiently destroy the metal complexes in such cases is needed.

2. Prior Art

U.S. Pat. No. 3,920,547 describes a process for the destruction of cyanides in an aqueous solution. In the process, an aqueous cyanide solution is contacted with an ozone containing gas while simultaneously being irradiated with ultraviolet light. The pH of the aqueous cyanide solution is held within a range of 5 to 9.

U.S. Pat. No. 4,012,321 describes a method for treating refractory organic compounds. The aqueous waste stream containing organic material, exhibiting a chemical oxygen demand or biological oxygen demand, is mixed with hydrogen peroxide. The hydrogen peroxide containing organic solution is irradiated with ultraviolet light to destroy the refractory organic compound, thereby reducing the chemical oxygen demand of the waste stream.

U.S. Pat. No. 4,289,549 describes a process for treating a liquid waste stream containing complex copper ions. The copper ion concentration of the solution is first adjusted to about 8 ppm after which the solution is contacted with an ozone containing gas and irradiated with ultraviolet light.

U.S. Pat. No. 4,446,029 describes a process for the destruction of cyanide in an aqueous solution containing an iron cyanide complex. The iron cyanide complex is destroyed by adjusting the pH of the solution to 11 to 12 and irradiating the solution with ultraviolet light. Afterwards, the pH of the solution is reduced to between 8 and 11 and allowed to react with hydrogen peroxide.

U.S. Pat. No. 4,512,900 describes a process for treating liquid waste compositions containing copper ions and a complexing agent. The concentration of copper ions in the waste material is reduced to less than about 8 ppm. The copper ion solution is then contacted with hydrogen peroxide followed by an ozone containing gas. The waste composition is then irradiated with ultraviolet light. In the process, the hydrogen peroxide destroys from about 20 to 60 weight percent of the total organic content of the waste stream and the ozone containing gas reacts with and destroys the complexing agent.

U.S. Pat. Nos. 4,792,407 and 4,849,114 describe a method of oxidizing toxic compounds in aqueous solutions. The method consists of simultaneously exposing an aqueous solution containing toxic hydrocarbon compounds to ozone, hydrogen peroxide and ultraviolet radiation in amounts sufficient to reduce the toxic constituents of the solution. The method is particularly useful for reducing the amount of halogenated hydrocarbon constituents and partially halogenated hydrocarbon constituents in an aqueous solution.

U.S. Pat. No. 4,846,978 describes a process for decomposing metal chelates by exposing a metal chelate containing aqueous solution to ozone gas in the presence of magnesium hydroxide.

EPRI Report No. NP-4954, pp. 3-41 to 3-49 (Nov. 1986) discussed "oxyphotolysis" of various metal chelates. The report indicates that the destruction of metal-EDTA chelates was not accelerated upon exposure to UV radiation during ozonation.

SUMMARY OF THE INVENTION

A principal object of this invention is to provide a method whereby an unstabilized metal complex is stabilized by destroying the unstabilized metal complex and converting the resulting metal ions into a stable insoluble precipitate. The stable insoluble precipitate can then be recovered or mixed in cement and safely disposed of in a landfill. Accordingly, in a broad embodiment, the present invention is a process for recovering metals from an aqueous solution containing at least one metal complex by adding an oxidizing agent to the aqueous solution to define an oxidizable aqueous solution. The oxidizable aqueous solution is thereafter exposed to a source of ultraviolet radiation for a period of time sufficient to destroy the metal complex and produce a metal ion containing aqueous solution. The metal ions are then recovered from the metal ion containing aqueous solution.

In a preferred embodiment, this invention is a process for recovering a metal precipitate from an aqueous solution containing a metal EDTA complex. The metal precipitate is produced by adding hydrogen peroxide to the metal EDTA containing aqueous solution to define an oxidazable aqueous solution. The oxidizable aqueous solution is then exposed to a source of ultraviolet radiation to produce a metal ion containing aqueous solution. The pH of the metal ion containing aqueous solution is adjusted to precipitate the metal. The metal precipitate is then recovered and may be disposed of or recycled.

DETAILED DESCRIPTION OF THE PREFERRED EMBODIMENTS

The present invention is a process for recovering metals from an aqueous solution containing at least one metal complex. Many chemical processes, and especially those in the electronics industry, produce aqueous waste solutions containing metals and metal complexes. The electronic industry and in particular electroplating and chemical plating processes used in the electronic industry produce a large amount of aqueous waste containing various metal by-products including metal EDTA complexes. These aqueous wastes are difficult to dispose of because they contain unstabilized metal and metal compounds.

Aqueous metal and metal complex containing waste solutions were typically treated by recovering the metals and metal complexes and encasing these waste products in cement and burying the cement in appropriate landfills. However, some metal complexes including metal EDTA complexes encased in the cement have a tendency to leach out of the cement and into the surrounding landfill. It has now been discovered that the complex metals in these aqueous streams can be treated and separated from the aqueous streams by first exposing the aqueous waste stream to an oxidizing agent followed by irradiation with a light source. This process destroys the metal complex and converts the metal portion of the metal complex into a more stable ionic form. The ionic form of the metal can then be recovered by precipitation or by other chemical or electrical processes.

The aqueous metal complex containing solutions that can be treated by the process of this invention include any aqueous solution that contains a metal complex that can be destroyed by the oxidation, irradiation process described below.

Specific examples of metal complexes and metal chelates that can be destroyed by the process of this invention include nickel, cadmium, and chromium associated with EDTA, NTA, citric acid, or other such molecules.

The concentration of the metal complex or metal chelates in the metal complex containing aqueous solution is not critical. However, the concentration of the metal complex will effect the amount of the oxidizing agent and the irradiation time required in the process. Therefore, the amount of oxidizing agent and irradiation time that is needed to destroy the metal complexes will increase with an increasing concentration of metal complexes in the aqueous solution.

The pH of the metal complex containing aqueous solution is important in promoting the process of this invention. The pH of the metal complex containing aqueous solution as produced by, for example, an electroplating process is not important. However, it is preferred that the metal complex containing aqueous solution directed to the instant process have a pH of about 4 to 8. The pH of the metal complex containing aqueous solution preferably will range from 4 to 8 in order to inhibit the precipitation of metal ions from the aqueous solution during the irradiation step. Precipitated metal ions will cloud the aqueous solution. Any metal ions that might precipitate as a result of combining with a hydroxyl ion will inhibit the ability of the irradiation source to destroy the oxidizing agent. Therefore, it is preferred that the pH of the metal complex containing aqueous solution be as low as possible without causing the oxidizing agent to decompose.

An oxidizing agent is combined with the metal complex containing aqueous solution to define an oxidizable aqueous solution. The oxidizing agent should be a compound that is altered in the irradiation step to produce an agent capable of attacking the complex molecule, such as an EDTA molecule, associated with the metal in the metal containing complex. Some oxidizing agents that are useful are hydrogen peroxide ($H_2O_2$), chlorine dioxide, ozone, and hypochloride compounds.

The concentration of the oxidizing agent in the oxidizable aqueous solution will vary depending upon the concentration of the metal complexes or metal chelates in the oxidizable aqueous solution. Generally, the concentration of the oxidation agent will vary from about 0.1 to 500 parts per million. However, the preferred concentration of oxidizing agent in the oxidizable aqueous solution is generally measured in relation to the concentration of the metal complex contained in the aqueous solution. It has been discovered that a threshold value from about 4 to 20 moles of oxidizing agent per mole of metal complex is required to disassociate the metal from the metal containing complex or chelate in the oxidizable aqueous solution. As a result, it is preferred that the oxidizable aqueous solution contain from about 20 to 100 moles of oxidizing agent per mole of metal complex.

The oxidizable aqueous solution is now exposed to an irradiation source. A light source is the typical irradiation source used in the process. The light source may emit light in a single wavelength or over a wide range of wavelengths. The light source may emit light continuously or intermittently in small bursts. The irradiation light source may be a laser type light source or it may be a light source that utilizes a gas such as mercury, sodium, neon, xenon, argon, or other element or combination of elements to produce light.

It is preferred that the light source emit a wavelength of light primarily in the range of from about 185 to 300 nanometers. A light source that emits a wavelength of light over about 300 nanometers has been found to be ineffective in promoting the destruction of the oxidizing agent.

The oxidizable aqueous solution is exposed to the irradiation source for a period of time sufficient to destroy the metal containing complex and produce a metal ion. It is believed that the irradiation source destroys the oxidizing agent, which thereafter attacks the complex portion of the metal containing complex. The destruction of the complex portion of the metal containing complex liberates metal ions creating a metal ion containing aqueous solution.

At this point, the metal ions in the metal ion containing aqueous solution can be recovered. The metal ions can be recovered by any method known in the art. Such methods include precipitation, electroplating, or any other process that converts the metal ions in the metal ion containing aqueous solution into a nonionic form.

A preferred method for removing the metal ions from the metal ion containing aqueous solution is precipitation. Precipitation is effectuated by, in the case of nickel ions for example, increasing the pH of the nickel ion containing aqueous solution so that it is basic. The pH of the nickel ion containing solution is increased to a pH of about 9 to 11. At this pH, nickel precipitates as nickel hydroxide and can be recovered by standard solid-liquid separation processes. The nickel hydroxide precipitate can then be stabilized and landfilled, or the nickel can be recovered as metal from the precipitate.

Once the process is complete, the aqueous solution will contain a significantly reduced amount or complete absence of metal complexes or chelates. At this point the aqueous solution can be disposed of by conventional water treating techniques.

EXAMPLE I

This example summarizes experiments where process variables such as irradiation time, NiEDTA concentration, and [$H_2O_2$/NiEDTA] mole ratios were varied in order to understand the effects of each variable on the efficiency of the process.

Three nickel solutions were used in the experiments. Solution 1 contained 60 ppm $Ni^{++}$ while solution 2 and 3 contained 60 and 120 ppm NiEDTA respectively.

Solution 1 was prepared by dissolving 242.0 mg $NiCl_2.6H_2O$ in 1000 ml of deionized water. Solution 2 was prepared by dissolving 918.9 mg $NiCl_2.6H_2O$ and 1608.4 mg $Na_4EDTA.2H_2O$ in 3800 ml of deionized water. Solution 3 was prepared by dissolving 1837.7 mg $NiCl_2.6H_2O$ and 3217.2 mg $Na_4EDTA.2H_2O$ in 3800 ml of deionized water.

In these experiments, a commercial 30% $H_2O_2$ solution was used.

The light source used for the experiments was a pulsed-plasma xenon flash lamp manfactured by Purus in San Jose, Calif. The light source wavelength and intensity remained constant for all experiments. The light source was immersed in a one gallon reactor in which the test solution was circulated with a pump.

In each experiment, four samples were taken from the 1 gallon reactor. The NiEDTA solution was introduced into the reactor and the circulating pump was turned on. A precalculated amount of $H_2O_2$ was added to the solution in the reactor and the circulation continued for additional 1 minute. At that time the first analytical sample (50 ml) was withdrawn. While circulating, the UV source was turned on and the reaction solution was irradiated for a duration of 1 minute. The UV source was turned off and an analytical sample of time 1 minute was removed. The UV source was turned on for an additional 2 minutes and another analytical sample (3 minutes) was withdrawn. Irradiation of the solution continued for an additional 2 minutes and the last analytical sample (5 minutes) was taken out.

All samples were analyzed for Ni (except those from the reactor using solution 1), were brought to a pH of 9-10 with NaOH solution, filtered through a 0.2 micron filter and submitted for analysis.

Solution samples 1 were filtered through a 0.2 micron filter at a pH of 7.4. A sample of this filtrate showed 61.8 ppm Ni. Sodium hydroxide was added to the remaining portion of solution 1 samples to bring the pH to 9.1, then filtered through a 0.2 micron filter. The filtrate contained 0.07 ppm Ni.

Results of the experiments conducted with reacted NiEDTA solutions having an initial Ni concentration of approximately 60 ppm with two concentrations of $H_2O_2$ are summarized in Table I. Results of identical experiments but with NiEDTA solutions having initial Ni concentration of 120 ppm, are summarized in Table II. A control experiment, run in the absence of $H_2O_2$, is summarized in Table III. Table IV is a repeat of the experiment summarized in Table II.

TABLE I

| Irradiation of 60 ppm Ni (in NiEDTA) solutions | | |
| --- | --- | --- |
| INITIAL [$H_2O_2$]/[Ni] M/M | TIME Min. | COMPLEXED Ni IN SOLUTION ppm |
| 10 | 0 | 60.2 |
| 10 | 1 | 57.8 |
| 10 | 3 | 53.4 |
| 10 | 5 | 44.9 |
| 30 | 0 | 60.8 |
| 30 | 1 | 55.8 |
| 30 | 3 | 17.5 |
| 30 | 5 | 5.35 |

TABLE II

| Irradiation of 100 ppm Ni (in NiEDTA) solutions | | |
| --- | --- | --- |
| INITIAL [$H_2O_2$]/[Ni] M/M | TIME Min. | COMPLEXED Ni IN SOLUTION ppm |
| 10 | 0 | 125 |
| 10 | 1 | 124 |
| 10 | 3 | 122 |
| 10 | 5 | 122 |
| 30 | 0 | 124 |
| 30 | 1 | 123 |
| 30 | 3 | 69.8 |
| 30 | 5 | 43.0 |

TABLE II

| Control Experiments (in the absence of $H_2O_2$) | | |
| --- | --- | --- |
| INITIAL [$H_2O_2$]/[Ni] M/M | TIME Min. | COMPLEXED Ni IN SOLUTION ppm |
| 0 | 0 | 63.6 |
| 0 | 1 | 60.1 |
| 0 | 3 | 59.1 |
| 0 | 5 | 59.1 |

TABLE IV

| Repeat Experiments | | |
| --- | --- | --- |
| INITIAL [$H_2O_2$]/[Ni] M/M | TIME Min. | COMPLEXED Ni IN SOLUTION ppm |
| 30 | 0 | 124 |
| 30 | 1 | 121 |
| 30 | 3 | 69.6 |
| 30 | 5 | 27.0 |

The determination of the extent decomposition of the Ni complex is based on removing (by precipitation and filtration) the uncomplexed (freed) Ni and determining the amount of soluble (chelated) Ni left in solution.

The control experiments summarized in Table III indicate that only insignificant chelate destruction is taking place under UV in the absence of hydrogen peroxide.

Samples taken for analysis were kept in the dark for at least 5 days before being analyzed. Samples that contained hydrogen peroxide, but were never exposed to UV light did not show any measurable reduction in Ni concentration. This finding is a very strong indication that practically no destruction is taking place in the presence of $H_2O_2$ but in the absence of UV light.

The results of experiments embodied in Tables I, II, and IV indicate that NiEDTA concentration is reduced when exposed to both hydrogen peroxide and UV light. Additionally, the results indicate that a solution having a high [$H_2O_2$/NiEDTA] mole ratio of 30 is superior in destroying the NiEDTA complex when compared to a solution having a mole ratio of 10.

EXAMPLE II

This example evaluates the ability of various wavelengths of light to destroy a NiEDTA complex.

Solutions of 35 ppm (0.6 mM) NiEDTA were combined with various concentrations of $H_2O_2$ by diluting the stock solutions. The initial pH of the solution was in the range of about 6.6 to 7.5. In early experiments all operations were performed in subdued laboratory light, but this precaution was discontinued when it became clear that such light had no effect on the results.

Three wavelengths of light were evaluated: 254, 313 and 366 nm. For the 313 and 366 nm experiments, the sample solutions nominally consisted of 35 ppm (0.6 mM) NiEDTA with 12 mM $H_2O_2$ for an $H_2O_2$:NiEDTA mole ratio of 20. The lamp cooling solution flow was started, and the system was allowed to warm up for approximately 30 minutes. About 4-5 ml of the sample was placed in a series of 9 ml tubes, which were then capped and placed in carousel reactors. The tubes were rotated around the light source and removed at varied time intervals. A 170 µl aliquot of each sample was taken for analysis of $H_2O_2$. Next the samples were adjusted to pH 9.2-10.7 and allowed to stand for at least 1 hour to allow nickel hydroxide to precipitate. Finally, each sample was syringe-filtered, diluted 3.4 fold with water, stabilized with 2 drops of concentrated $HNO_3$, and submitted for nickel analysis by atomic absorption spectrometry. Controls for the direct photolysis of the NiEDTA complex were run in the absence of $H_2O_2$.

The 254-nm experiments were performed with 35 ppm NiEDTA solution and $H_2O_2$ concentrations of 2.2, 12, and 60 mM resulting in [$H_2O_2$/NiEDTA] mole ratios of 3.6, 20, and 100, respectively. The lamp/filter system was preheated for 30 minutes and then immersed in 180 ml of the reactant solution contained in the 4.15 cm diameter cylinder. The solution was stirred with a magnetic stirrer and cooled externally by a fan. The solution temperature did not rise significantly above room temperature. Samples were removed with a pipettor at the desired time intervals and treated as described above. Controls were again run in the absence of $H_2O_2$.

The $H_2O_2$ concentration of each sample was determined photometrically by the titanium method as modified by Satterfield and Bonnel (1955). Samples were mixed with sufficient quantities of 12.5M $TiSO_4$ in 3N $H_2SO_4$ to form the yellow Ti-peroxide complex, the absorbance of which was measured at 420 nm in a 1 cm cell. At this wavelength the extinction coefficient of the complex was found to be 720 $M^{-1}cm^{-1}$ on the basis of the concentration of $H_2O_2$ calculated from the $KMnO_4$ titration assay.

The concentration of nickel remaining in each sample was determined in triplicate by flame atomic absorption at 232 nm on a Varian SpectrAA 300/400 system. Standards in the 1 to 12 ppm range were run daily and a calibration curve fitted automatically by the software; the calibration curve was then used to calculate the concentrations in the samples. The relative standard deviation of the standards was typically <2%, and that of the samples was typically <5%. Blank readings were negligible, and the presence of EDTA in the system had no effect on the nickel determination.

Absorption spectra of the $NiCl_2$, NiEDTA, and NiEDTA—$H_2O_2$ mixtures were obtained on a HP8450 UV-VIS Spectrometer in 1 cm cells after dilution as necessary to yield absorbance values less than 2.

Sample pH was measured on an Orion Model 601A pH meter fitted with a Ross combination electrode and calibrated with National Bureau of Standards traceable buffers at pH 4, 7 and 10.

Essentially no insolubilization of Ni or photolysis of $H_2O_2$ occurred at either 313 or 366 nm over an 8 hour period. Therefore, the light intensity and extinction at these wavelengths appear too low to allow a practical treatment process. The lack of loss of Ni in these experiments also indicates that direct photolysis of the NiEDTA complex is negligibly slow. This conclusion is verified even for 254 nm by the control experiments in which NiEDTA was photolyzed only to a small extent in the absence of $H_2O_2$.

Photolysis of $H_2O_2$ does occur at 254 nm. However, no insolubilization of NiEDTA occurred at the [$H_2O_2$/NiEDTA] mole ratio of 3.6. This result suggests that while hydroxyl radicals must have been generated and attacked the complex, the EDTA was not oxidized enough to break the complex sufficiently to allow precipitation after raising the pH. Therefore, experiments were performed at [$H_2O_2$/NiEDTA] mole ratios of 20 and 100. At these ratios the $H_2O_2$ concentration is great enough to destroy the NiEDTA complex. Thus, somewhere between about 4 and 20 moles of $H_2O_2$ per mole of complex are desirable to oxidize the EDTA enough to prevent the products from keeping the Ni in solution at high pH. It is believed that this result is due to the loss of hydroxyl radicals to reaction with $H_2O_2$ rather than EDTA and because even partially oxidized EDTA should still strongly complex the Ni. The insolubilization reaction is faster at an [$H_2O_2$/NiEDTA] mole ratio of 100 than at a ratio of 20. However, the difference was not great.

Some preferred embodiments of the present invention have been described. However, additional embodiments not specifically described may fall within the spirit and scope of the present invention.

What we claim is:

1. A process for recovering metals from an aqueous solution containing metal ion EDTA complexes comprising
    adding hydrogen peroxide to the aqueous solution to define an oxidizable aqueous solution;
    exposing the oxidizable aqueous solution to a source of ultraviolet radiation having a wavelength of from about 185-300 nanometers for a period of time sufficient to oxidize the complex portion of the metal ion EDTA complex to liberate metal ions from said metal ion EDTA complex to define a metal ion containing aqueous solution; and
    precipitating said liberated metal ions from the metal ion containing aqueous solution.

2. The process of claim 1 wherein the metal ion EDTA complex is nickel EDTA.

3. The process of claim 1 wherein the molar ratio of the concentration of the oxidizing agent to the metal ion EDTA complex in the oxidizable aqueous solution ranges from about 20 to about 100.

4. The process of claim 1 wherein the oxidizable compound is present in the aqueous oxidizable solution in an amount ranging from about 0.1 ppm to about 500 ppm.

5. The process of claim 1 wherein the pH of the metal ion containing aqueous solution is adjusted so that the metal ion precipitates in the aqueous solution to define a metal precipitate.

6. A process of recovering nickel from an aqueous solution containing nickel ion EDTA complex comprising the steps of:
   a. adding hydrogen peroxide to the aqueous solution to define an oxidizable aqueous solution;
   b. exposing the oxidizable aqueous solution to a source of ultraviolet radiation having a wavelength of from about 185 to about 300 nanometers to oxidize the complex portion of the nickel ion EDTA complex to liberate nickel ions from said nickel ion EDTA complex to produce a nickel ion containing aqueous solution;
   c. adjusting the pH of the aqueous solution to cause the precipitation of liberated nickel ions in the form of a nickel precipitate; and
   d. recovering the nickel precipitate.

7. The process of claim 6 wherein the $H_2O_2$/NiEDTA mole ratio of the oxidizable aqueous solution ranges from about 20 to about 100.

* * * * *